INVENTOR
GERALD C. SUMMERS

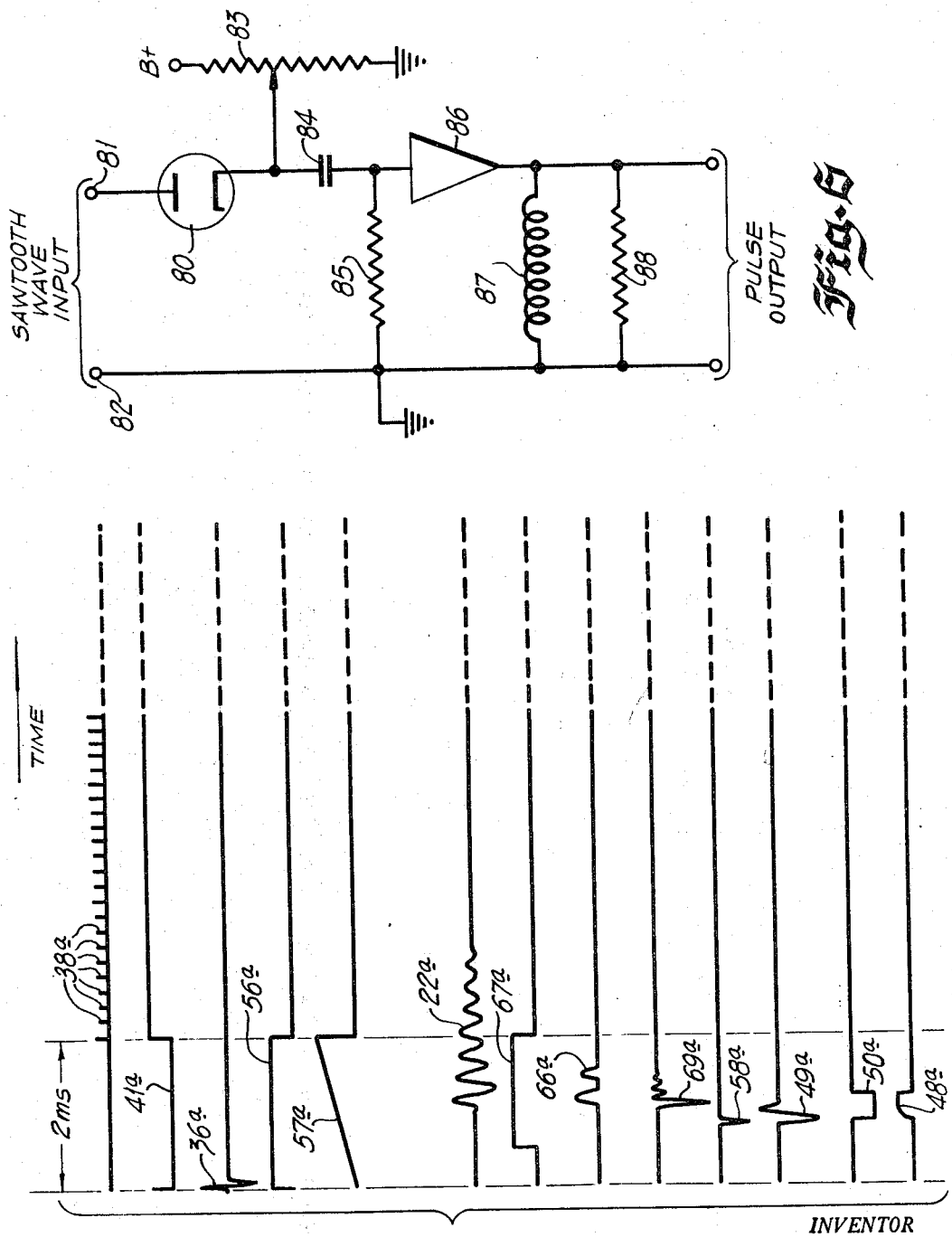

Jan. 3, 1967  G. C. SUMMERS  3,295,628
ACOUSTIC WELL LOGGING METHOD AND APPARATUS
Filed March 23, 1962  3 Sheets-Sheet 3
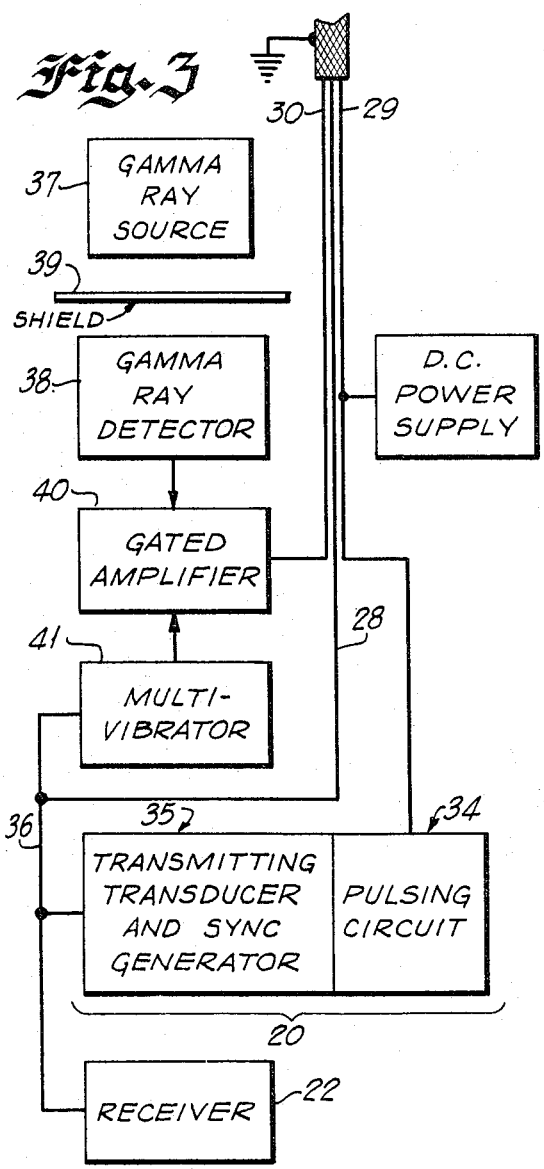
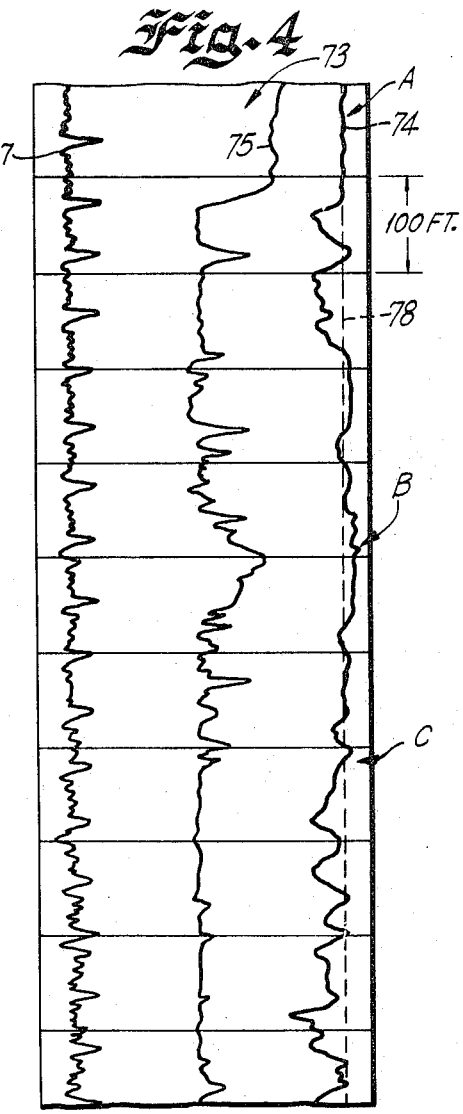
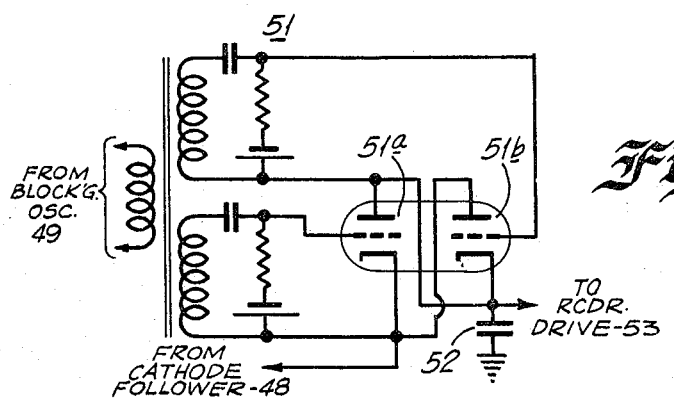
INVENTOR
GERALD C. SUMMERS
BY Mason, Kolehmainen,
Rathburn and Wyss
ATTORNEYS

United States Patent Office 3,295,628
Patented Jan. 3, 1967

3,295,628
ACOUSTIC WELL LOGGING METHOD
AND APPARATUS
Gerald C. Summers, Dallas, Tex., assignor, by mesne assignments, to PGAC Development Company, Houston, Tex., a corporation of Texas
Filed Mar. 23, 1962, Ser. No. 181,859
9 Claims. (Cl. 181—.5)

The present invention relates generally to acoustic well logging and is more particularly concerned with a method and apparatus for determining the quality of the cement bond between the casing and the walls of a borehole.

In the production of water free hydrocarbons such as gas or oil from a well a common practice is to insert cement into the spacing between the casing and the borehole walls, thus producing a squeeze effect at the level of the well where the hydrocarbons are being extracted. Frequently, the cement does not fill the entire space between the casing and the borehole walls due to failure to bond either with the earth formations or with the outer surface of the casing. It is important to be able to log the cased well to determine the quality of the cement bond at the different borehole depths of interest and the present invention is, therefore, directed to a new and improved method and apparatus for accomplishing this result.

It has been found that the attenuation of acoustic energy in passing from a transmitter to a spaced receiver is a very useful parameter in measuring the quality of the cement bond. Thus, in areas of the borehole where there is little or no cement or where the bond to the casing is very poor, a major portion of the acoustic energy will travel through the casing as it traverses the distance between the transmitter and the receiver and very little energy will pass to the earth formations. The absence of cement or a poor quality bond prevents any appreciable refraction of the acoustic energy into the borehole formations and, as a result, this energy arrives at the receiver at a very high amplitude. On the other hand, when the cement bond is very good, most of the acoustic energy is refracted through the earth formations and/or the cement and very little passes through the casing. Thus, a measurement of the amplitude of the energy reaching the receiver through the casing provides an indication of the quality of the cement bond. However, in some cases, particularly in logging high velocity layers such as limestone or dolomite, the energy travelling through the earth formations arrives at the receiver prior to the somewhat more slowly travelling energy passing through the casing. Thus, if a measurement is made of the amplitude of the signal initially arriving at the receiver, such a measurement, standing alone, cannot provide a determination of the cement bond quality because it is impossible to determine whether the casing signal or the formation signal is arriving first. However, if a velocity measurement is made simultaneously with the amplitude measurement to indicate the shortest travel time of the acoustic energy from the transmitter to the receiver irrespective of the path traversed, those areas where the formation signal arrives prior to the casing signal can be readily determined and this information can be used in analyzing the amplitude or attenuation log. The prevent invention, therefore, has for a principal object the provision of a new and improved well logging system for logging cased boreholes by producing simultaneously an amplitude or attenuation curve, a velocity or travel time curve, and a casing collar indication. The amplitude measuring portion of the system is similar to the arrangement described and claimed in copending application Serial No. 846,974 of Gerald C. Summers and Charles H. Thurber, assigned to the same assignee as the present invention.

The invention has for a further object the provision of a new and improved method for determining the quality of the cement bond by simultaneously logging an amplitude curve and a velocity curve while, at the same time, providing indications from which the locations of the casing collars can be determined.

A further object of the invention is to provide a well logging system for simultaneously producing a velocity curve and an amplitude curve but which is, at the same time, characterized by simple, relatively inexpensive construction.

The foregoing and other objects are realized, according to the present invention, by providing a well logging system employing a downhole tool carrying both a transmitter of successive spaced apart signal pulses and a receiver spaced a fixed distance from the transmitter in a direction extending longitudinally of the borehole. A gamma ray radioactivity or other casing collar locator section is also included in the downhole tool and includes a radioactive source for emitting rays which are scattered in the casing of the well and returned to a detector shielded from direct radiation from the source. The number of rays arriving at the detector during a predetermined period is a function of the thickness of the well casing and the detected rays may, therefore, be used to develop a casing collar log.

A gated circuit included in the transmission path from the casing collar detector to the surface equipment has its conductivity controlled by a gating signal in such manner that no casing collar locating signals are transmitted to the surface for a brief interval following each transmitter pulse. The gating signal is developed in response to a synchronizing pulse developed in coincidence with the transmitter pulse. Thus, casing collar locating signals are sent to the surface for a major portion of each period between successive transmitter pulses but for a brief interval at the beginning of each such period the casing collar measuring equipment is rendered ineffective. The brief interval is slightly greater than the time required for the pulse to pass from the transmitter to the receiver and during each such interval measurements are made both of the amplitude or attenuation of the signal arriving at the receiver and of the velocity or travel time of the pulse in traversing the fixed distance between the transmitter and the receiver. The velocity and amplitude curves are recorded simultaneously with the casing collar curve to correlate all of the collected information in order to permit an accurate analysis of the quality of the cement bond.

The invention, both as to its organization and manner of operation, together with further objects and advantages, will best be understood by reference to the following description taken in conjunction with the accompanying drawings wherein:

FIG. 2 shows a group of typical waveforms which are useful in explaining the operation of the system shown in FIG. 1;

FIG. 3 is a diagrammatic illustration showing downhole equipment which may be used in the system shown in FIG. 1;

FIG. 4 shows a portion of a log which may be developed by operation of the system shown in FIG. 1;

FIG. 5 is a schematic diagram showing a keyed rectifier circuit which may be used in the system shown in FIG. 1; and FIG. 6 is a schematic diagram showing a pick-off control which may be used in the system shown in FIG. 1.

Figure 1:
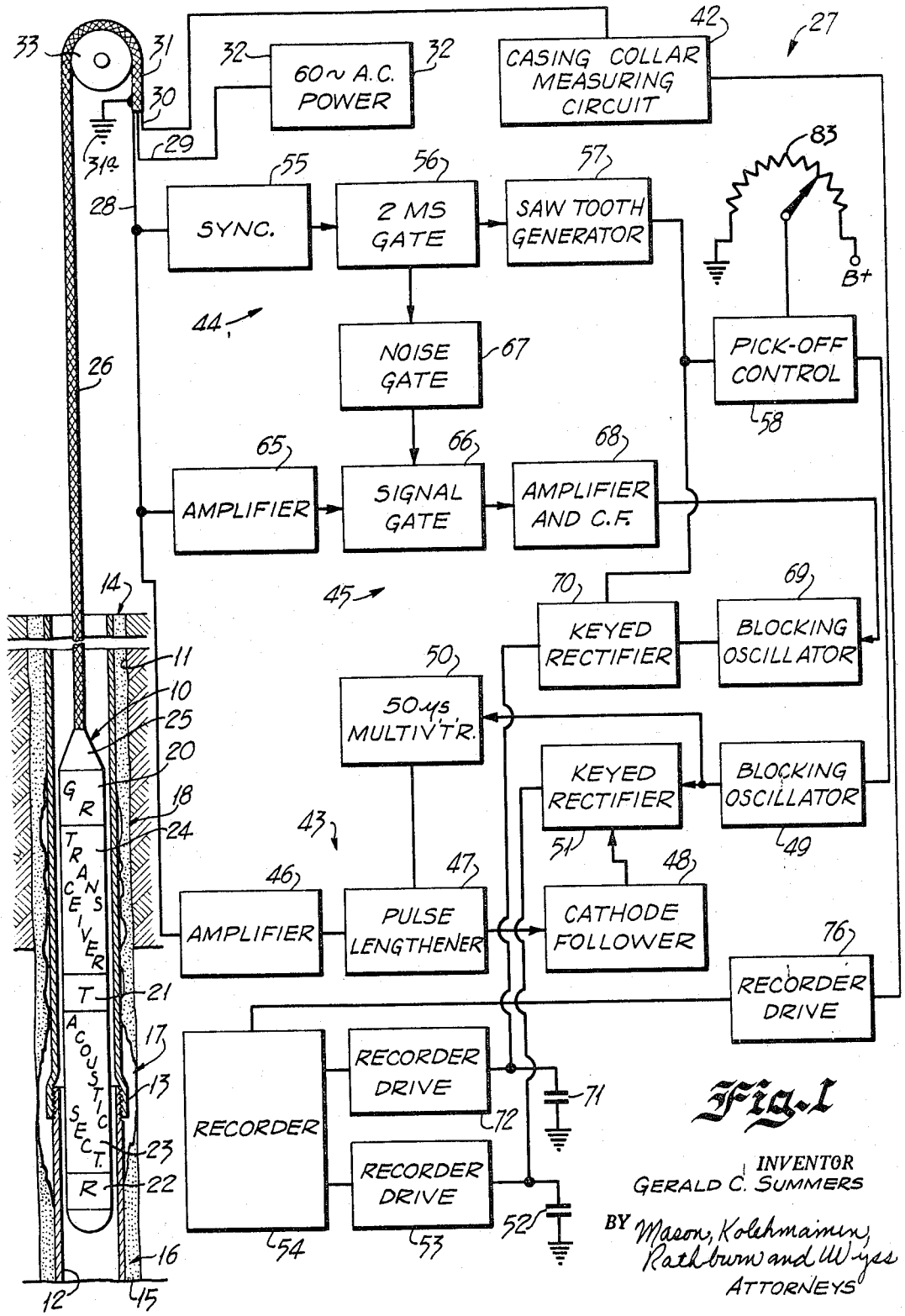
FIG. 1 is a partially schematic, partially diagrammatic view of a well logging system characterized by the features of the present invention with the downhole tool of the system being illustrated within a section of a cased borehole extending into the earth.

Referring now to the drawings and first to FIG. 1, a well logging system embodying the principles of the present invention is there shown as including a downhole tool 10 disposed within a borehole 11 extending into the earth from the surface. The borehole 11 has been cased by a plurality of casing sections 12 secured together in end to end relationship as, for example, by threading one end of each section into a collar 13 formed on the adjacent section. The casing is usually formed of steel and, in the case of casings using overlapped joints between the collars 13, a double thickness of such material exists at each of these joints.

As was previously indicated, it is often desirable in the production of hydrocarbons to pour cement into the generally annular space 14 existing between the casing sections 12 and the walls of the borehole 11, this cement being identified by the reference numeral 15 in FIG. 1. As is shown in the drawings, the cement 15 does not always bond firmly to the outer periphery of the casing sections 12 or to the borehole walls and, as a result, there may exist at different borehole depths areas such as that shown at 16 where the bonding is very good, areas such as that shown at 17 where there is little or no cement, and other areas such as that shown at 18 where the cement bond is of intermediate quality.

The well logging system of the present invention is adapted to provide information useful in indicating the quality of the cement bond at the different borehole depths and, to this end, it produces simultaneously an amplitude or attenuation curve, a velocity or travel time curve and a casing collar curve for indicating the borehole depths at which the collars 13 are located. To provide these three curves, the downhole tool 10 includes a casing collar detecting section 20, a transmiting transducer or transmitter section 21, a receiving transducer or receiver section 22, an acoustic isolating section 23 which spaces and electrically insulates the sections 21 and 22, and a transceiver or electronics section 24 containing the electronic components of the downhole tool described more fully hereinafter. The sections of the downhole tool may be housed within generally cylindrical casings provided with threaded couplings (not shown) at both ends and these casings are secured together end to end in well known manner. Suitable electrical connectors are provided between the different sections but these are conventional and, hence, are not shown in the drawings.

The uppermost section 20 is secured to a cable head 25 which is, in turn, connected to the lower end of a cable 26 extending through the borehole and connected at the earth's surface to surface equipment indicated generally by the reference numeral 27. The cable may include any number of conductors necessary to provide the desired electrical connections between the downhole tool 10 and the surface equipment 27 but in the form shown a cable is employed having three inner conductors 28, 29 and 30 insulated from each other and housed within an outer conducting sheath 31. The outer sheath is grounded both in the downhole tool 10 and, as indicated at 31a, at the surface equipment to provide a common ground connection. At the surface the cable 26 is trained over a sheave 33 which may be motor driven and which cooperates with the cable to form a means to raise or lower the tool 10 within the borehole.

Power for the electronic circuits of the downhole tool 10 is supplied from a conventional 60 cycle A.C. power source 32 in the surface equipment over one of the conductors 29, the return connection, of course, being provided by the grounded outer sheath 31. The power is delivered to the downhole tool by a phantoming circuit arrangement of the type well known in the art and described briefly in the above-identified copending application Serial No. 846,974.

As is shown in FIG. 3, the transmitting section 21 includes a transmitting transducer and a pulsing circuit 34 which is preferably a free-running high-power pulse source of the type described in U.S. Patent No. 2,737,639. The transmitting transducer is pulsed by the circuit 34 to emit pulses at a suitable repetition rate, for example, at a rate of about 15 to 30 pulses per second. In the ensuing description, a repetition rate of 20 pulses per second will be assumed thus providing a period of 50 milliseconds between successive pulses. While the receiver 22 may be spaced from the transmitter 21 any suitable distance, preferably provision is made for a spacing of either 4, 5, 6, 7, or 8 feet by the insertion of an acoustic section 23 of the proper length. In any event, the spacing is such that all of the acoustic energy necessary for the production of the velocity and amplitude curves will arrive at the receiver 22 within an interval of 2 milliseconds following the acoustic pulse and, hence, the velocity and amplitude measurements are made during the first 2 milliseconds of each period which may be referred to as the measuring interval. The transmitting transducer and its associated pulse source 34 comprise means 35 for generating a series of spaced apart acoustic or elastic pulses coupled by the borehole fluid to the casing sections 12 and from the casing sections through the cement 15 to the earth formations surrounding the borehole. As is described in the aforementioned copending application Serial No. 846,974, a small portion of each pulse from the transmiting transducer is used to develop a synchronizing pulse which appears upon an output lead 36 from the generating means 35 and is used as a timing pulse in the downhole tool 10. The synchronizing pulse also controls the timing of the surface equipment 27 and, to this end, it is transmitted to the latter equipment via a transmission circuit including the conductor 28.

The receiver section 22 includes a receiving transducer of conventional construction for converting the received acoustic or elastic energy into corresponding electrical signals which are transmitted to the surface equipment via a circuit including the conductor 28. The signals detected by the receiver 22 are represented by the waveform 22a in FIG. 2 where the 50 millisecond period between successive pulses has been broken so that the 2 millisecond measuring interval is effectively expanded or emphasized.

The casing collar locating section 20 may be either of the conventional magnetic or induction types or, as shown in the drawings, it may be of the raidoactivity type utilizing a source of radioactive waves such as a gamma ray source 37 shown in FIG. 3. For example, the source 37 may comprise a small amount of radium emitting gamma rays to penetrate the casing sections 12 where they are diffused and scattered. The degree of diffusion and scattering of the gamma rays is a function of the thickness of the casing section and, as a result, this thickness determines the number of rays returned to a highly sensitive radiation detector 38. To prevent direct radiation from the source 37 to the detector 38 there is disposed between these two elements a shield 39 formed of high density metal such as a tungsten alloy and a similar shield (not shown) may surround a portion of the detector to protect it from undesired gamma rays. The latter detector responds to the gamma rays returned from the casing by developing electrical pips or signals representing the gamma rays and identified in FIG. 2 by the reference numeral 38a.

The output of the detector 38 is applied to one or more amplifier stages including a gated amplifier 40, the conductivity of which is adapted to be controlled by a gating signal supplied from a triggered, monostable multivibrator circuit 41. The multivibrator 41 is triggered by the synchronizing pulse from the circuit 35 and develops a square wave gating signal having a duration equal to the 2 millisecond measuring interval of each cycle. This gating signal is effective to cut off the gated amplifier 40 and render it ineffective to transmit the electrical signals from the detector 38 during the 2 millisecond measuring interval of each period. The synchronizing signal is indicated in FIG. 2 by the reference numeral 36a while the square wave gating signal is indicated at 41a. The output of the gated amplifier 40 is applied through a transmission circuit including the cable conductor 30 to a casing collar measuring circuit 42 in the surface equipment. The later circuit is of conventional construction and includes an integrator for counting the number of gamma rays arriving at the detector 38 during one or more of the periods between succesive synchronizing pulses 36a. The circuit 42 also includes means for recording the output of the integrator and may comprise for example, a recording galvanometer for recording on a sensitized medium driven in synchronism with the sheave 33 a curve representing the number of detected gamma rays as a function of borehole depth. At borehole depths where the casing collars 13 are located the latter curve will exhibit an increase in the number of detected gamma rays and, hence, the depths of the different casing collars may be readily determined.

As will be readily apparent from the foregoing description the casing collar measuring circuit 42 does not receive any signals corresponding to the detected gamma rays during the 2 millisecond measuring interval but, since this interval is of fixed duration, it equally affects all of the integrating periods between successive transmitter pulses and, hence, for all practical purposes the gating of the casing collar circuit has no effect on the casing collar curve.

During each 2 millisecond measuring interval, however, the signal arriving at the receiver 22 from the transmitter 20 is used in the surface equipment 27 to provide measurements of both the travel time required for the pulse to traverse the distance between the transmitter and the receiver and the amplitude of the initially arriving portion of the received signal. Thus, the duration of the gating signal 41a must be slightly greater than the time required for the transmitter pulse to reach the receiver either through the casing sections 12 or through the earth formations around the borehole. To permit the amplitude and velocity measurements, the synchronizing pulses 36a and the output of the receiver 22 are applied to the surface equipment 27 via a transmission circuit including the cable conductor 28 which is connected at the surface to an amplitude measuring channel 43, a timing channel 44 and a velocity measuring channel 45. The channel 43 functions to provide the amplitude measurement. The channel 44 functions to gate both the amplitude measuring channel 43 and the velocity measuring channel 45 so that these channels are not triggered by spurious noises or the like and, hence, respond only to signals arriving at the receiver 22 from the transmitter 21. In addition, the timing channel 44 and the velocity channel 45 cooperate to provide the velocity or travel time measurements. More specifically, the amplitude measuring channel 43 comprises an amplifier 46 for amplifying the signals detected by the receiver 22 and for passing these signals to a pulse lengthener 47 and cathode follower 48. The amplitude measuring channel further comprises a blocking oscillator 49 and a multivibrator 50. The circuits 47, 48, 49 and 50 are identical to the similarly entitled circuits described in detail in the copending application Serial No. 846,974 referred to above. Thus, the pulse lengthener and cathode follower are identical to the circuit identified in the copending application by the reference numeral 171 and shown in detail in FIG. 4, the multivibrator 50 is identical to the circuit 167 and the blocking oscillator 49 corresponds to the blocking oscillator A or B of the copending application. As will be evident from the detailed description in the latter application the pulse lengthener 47 and cathode follower 48 cooperate to develop an output which is proportional to the first excursion of the received signal 22a in a predetermined direction, for example, in a positive direction. The multivibrator 50 is triggered by the blocking oscillator 49 to provide a rectangular wave output indicated at 50a in FIG. 2 and having a duration which is preferably very short, for example, about 50 microseconds. As is described more fully below the blocking oscillator 49 triggers the multivibrator 50 at a predetermined time just prior to the expected arrival of the casing signals at the receiver 22. The duration of the wave 50a is sufficient to embrace the period during which the casing signals arrive at the receiver and this wave is effective to render the pulse lengthener 47 and cathode follower 48 effective to develop a lengthened pulse output 48a having an amplitude proportional to the first positive excursion of the signal detected by the receiver 22 and having a pulse width corresponding to the duration of the wave 50a. The lengthened pulse output from the cathode follower 48 is applied to a keyed rectifier 51 and storage capacitor 52 which, taken together, form a circuit of the type identified by reference numeral 32 in U.S. Patent No. Re. 24,446. This circuit is shown schematically in FIG. 5 and functions in a manner which will be apparent from an understanding of the operation of the circuit disclosed in the Patent No. Re. 24,446. More specifically, the keyed rectifier circuit 51 includes a pair of triodes 51a and 51b for charging the capacitor 52 to a voltage proportional to the amplitude of the pulse output from the cathode follower. If the amplitude of the pulse from the cathode follower 48 is lower than the then existing voltage on the capacitor 52, the triode 51a conducts during the positive half cycles of the A.C. signal applied to its grid so that the capacitor discharges to the lower level of the signal from the cathode follower. If the pulse from the cathode follower 48 is higher than the voltage on the capacitor 52, the triode 51b conducts during the positive half cycles of the A.C. signal applied to its grid, thus charging the capacitor 52 to the higher voltage level of the input pulse. The A.C. signal supplied to the primary winding of the input transformer 51c for the keyed rectifier circuit may be obtained either from the blocking oscillator 49 or from the blocking oscillator 69 but is shown as being derived from the oscillator 49. In either case the A.C. signal is the characteristic acoustic signal similar to the signal 22a and containing a large proportion of frequency content in the order of 20,000 cycles. This frequency content makes several half cycles available for effecting conduction through the triodes 51a or 51b. Since the discharge circuit for the capacitor 52 during the time between operations of the keyed rectifier 51 is through the very high impedance of the non-conducting triodes 51a and 51b, the capacitor does not discharge appreciably during this period. Thus, the voltage across the capacitor 52 is proportional to the amplitude of the pulse 48a and this voltage is applied to a first recorder drive 53 of a conventional oscillograph recorder 54. The latter recorder may include a plurality of recording galvanometers one of which is controlled by the drive 53 to deflect a light beam impinging upon a sensitized recording medium driven past the beam in synchronism with the sheave 33. The deflection of the beam is, of course, proportional to the voltage across the capacitor 52 and, as a result, the recorder develops a first continuous curve representing the amplitude of the first positive excursion of the pulse 48a. The drive 53 also may be used to control a recording pen or stylus acting upon a recording medium. In either case the recorder drive 53 is effective to develop upon a record 73 (FIG. 4) a conventional amplitude curve 75, and the record may, if desired, be calibrated in terms of attenuation in view of the fact that the amplitude of the detected signal is inversely proportional to the attenuation introduced by the earth formations or by the casing. By appropriate changes in polarities of the various circuits, the recorder drive 53 could, of course, be made responsive to the amplitude of the first negative excursion of the detected signal.

Turning next to the timing channel 44, it will be observed that this channel comprises a sync amplifier 55 for amplifying the synchronizing pulse 36a to provide a trigger for a multivibrator 56 of the type shown in U.S. Patent No. Re. 24,446. The latter multivibrator develops a square wave output 56a for application to a timing signal or sawtooth generator 57 to develop a gradually changing or monotonically varying output signal 57a. Preferably, the generator 57 is a conventional bootstrap sawtooth generator of the type disclosed in U.S. Patent No. Re. 24,446 for producing a sawtooth wave having its initial rise beginning with the synchronizing pulse 36a and continuing to rise linearly throughout the 2 millisecond duration of the square wave 56a. When the sawtooth reaches a predetermined amplitude, it becomes sufficient to trigger a pick-off control circuit 58 to develop a sharp timing spike or pulse 58a for triggering the blocking oscillator 49. The pulse or spike 58a is produced at a predetermined, but adjustable time following the generation of the transmitter pulse and this time is pre-set so that it is slightly shorter than the time required for the pulse to pass from the transmitter 21 through the fluid in the borehole and through the casing and back through the fluid to the receiver 22. Since the casing travel time is about 58 microseconds per foot and the travel time through the borehole fluid is about 200 microseconds per foot, a four-foot transmitter to receiver spacing in a six-inch inner diameter casing with three-inch diameter transducers will require a pre-set time of about 280 microseconds. Other spacings and/or different diameter casings will, of course, require a change in the pre-set time between the transmitter pulse and the development of the spike 58a.

One form of pick-off control which could be used to perform the functions just described is illustrated in FIG. 6 and comprises a diode 80 having its anode connected to one terminal 81 of the output of the sawtooth wave generator 57. The other output terminal 82 of the sawtooth wave generator is grounded. The cathode of the diode 80 is connected to a controlled D.C. voltage, for example, to the movable arm of a potentiometer 83 having its winding connected across a D.C. voltage, that is, between a positive or B+ terminal and ground. Obviously the movable arm of the potentiometer 83 may be adjusted to supply a predetermined positive voltage to the cathode of the diode 80. The latter diode prevents flow of current until the sawtooth wave 57a reaches a level equal to or slightly greater than the D.C. voltage applied to the cathode but as soon as the sawtooth wave exceeds the latter level current flows through the diode to a differentiator circuit formed by a capacitor 84 and a resistor 85. The positive going portion of the differentiator circuit output appearing across the resistor 85 is applied to an amplifier 86 to develop the sharp negative pulse 58a. The signal output of the amplifier 86 may be clipped, if desired, to eliminate any positive going signal and, in addition, the negative pulse may be sharpened by a second differentiation performed by an inductor 87 connected in parallel with a resistor 88. The pulse 58a is, of course, generated after a predetermined delay following the transmitter pulse and this delay is controlled by the potentiometer 83 so that it is slightly shorter than the time required for the acoustic pulse to travel from the transmitter 21 to the receiver 22 through the borehole fluid and the casing. The output of the pick-off control circuit 58 is applied to the blocking oscillator 49 so that the amplitude measuring channel 43 is effective to measure the amplitude of the received signals in the manner described above. In this connection, it will be observed that the spike 58a triggers the blocking oscillator 49 which, in turn, drives the multivibrator 50 to develop the square wave 50a beginning at a time coincident with the spike 58a, i.e., at a pre-set time following the synchronizing pulse. The duration of the square wave 50a is sufficient to permit measurement of the amplitude of the first positive excursion of the casing signal arriving at the receiver 22. However, pulses travelling through the earth formations at a velocity equal to or slightly greater than the velocity of the casing signals i.e. those signals which arrive during the duration of the square wave 50a, may affect the amplitude measurement. The pulse lengthener 47 and the cathode follower 48 obviously do not respond to signals ariving at the receiver 22 prior to the generation of the spike 58a nor do they respond to signals arriving after the square wave 50a and, as a result, the recorder drive 53 is not triggered by noises or spurious signals occurring during these periods.

Considering next the operation of the channel 45, it will be observed that this channel includes an amplifier 65 for amplifying the signals 22a detected by the receiver 22. The amplified signals are applied to a gated circuit or signal gate 66 of the type disclosed in U.S. Patent No. 2,862,104 and this gate is also supplied with a gating square wave signal 67a (FIG. 2) from a noise gate 67. The noise gate 67 is a monostable multivibrator of the type shown in U.S. Patent No. Re. 24,446 and is excited by the square wave output of the 2 millisecond multivibrator 56 but this square wave is first passed through a delay circuit in the noise gate to delay the start of the gating signal 67a for a fixed period following the synchronizing pulse 36a as is shown in FIG. 2. The delay circuit portion of the noise gate may be of the type identified by the reference numeral 25 in U.S. Patent No. 2,768,701. The gated circuit 66 is nonconductive until it receives the square wave gating signal 67a and, hence, during the delay period no signals are passed to its output terminals. Signals detected during the period of the gating signal 67a are passed to the signal gate 66 which acts to develop at its output terminals signals of only one polarity, for example, positive going signals 66a as shown in FIG. 2. The latter signals are passed through an output amplifier and cathode follower 68 to a conventional blocking oscillator 69, similar to the blocking oscillator 49 described above, for developing in response to the first half wave a sharp trigger pulse 69a to excite a keyed rectifier circuit 70 which is also supplied with the linear sawtooth wave 57a from the generator 57. The keyed rectifier may be identical to that disclosed in the above-identified Patent No. Re. 24,446 and is effective to control the charging and discharging of a storage capacitor 71 connected across its output. As will be evident from an understanding of the latter patent, the blocking oscillator 69 triggers the keyed rectifier circuit 70 to charge the capacitor 71 to a level corresponding to the amplitude of the sawtooth wave 57a at a time corresponding to the instant of first arrival of the pulse from the transmitter 20 at the receiver 22. During the succeeding velocity measuring periods, if the first arrival at the receiver occurs earlier than the previous one, thus indicating a higher velocity of propagation, the sawtooth 57a will have reached a lower level at the time when the blocking oscillator 69 is triggered so that the capacitor 71 discharges to a somewhat lower level. Conversely, if the first energy takes longer to reach the receiver the charge on the capacitor 71 is increased to a higher level. Thus, the voltage across the capacitor 71 is proportional to the time expiring between the transmission of a pulse from the transmitter 21 and the arrival of the first portion of the resulting energy at the receiver 22. This voltage is applied to a second recorder drive 72 of the recorder 54 to develop upon the record 73 a conventional single receiver, continuous, velocity curve 74 representing as a function of borehole depth the velocities of propagation of the pulses either through the borehole casing or through the different formations disposed between the transmitter 21 and the receiver 22 as the tool 10 is moved within the borehole 11. Since the blocking oscillator 69 responds to the initial portion of the energy arriving at the receiver, assuming, of course, that this initial energy is of sufficient amplitude to operate the velocity channel, the velocity curve will represent the travel time or velocity of the pulses passing through the borehole casing except for those borehole depths where the borehole formations have a higher velocity of propagation than the steel casing. The casing collar curve may be developed by a third recorder drive 76 of the recorder 54 so that this curve (indicated at 77 in FIG. 4) appears side by side with the curves 74 and 75 but the casing collar curve 77 may also be produced upon a separate record if desired.

Turning now to the analysis of a typical log like that shown in FIG. 4, which is a log taken in a borehole containing at least a few high velocity formations, it will be observed that areas such as that indicated at A indicate the presence of a poor quality cement bond since the amplitude curve 75 indicates a very low attenuation in this area while the velocity curve 74 indicates a velocity coinciding with the velocity of propagation of the acoustic energy through the steel casing sections. In this connection, the reference line 78 indicates the velocity of propagation of acoustic energy through the steel casing while areas to the right of this line indicate higher velocities and areas to the left indicate lower velocities. The high amplitude of curve 75 in the region B might be caused by limestone or dolomite formations which transmit the acoustic energy at a high energy level. From the region C to the bottom of the record portion 73 shown in FIG. 4, the formations contain predominant quantities of shale and the velocity curve shows a signal arriving at the receiver 22 after the casing signal. In this area the cement bond is obviously very good in that a major portion of the acoustic energy is reported into the cement and the earth formations with the result that the casing signals are not strong enough to operate the velocity channel 45. In areas where the velocity curve 74 indicates velocities lower than that of the steel casing, the analyst can be certain that the amplitude of the casing signals are being measured and the low level of these signals indicates the good quality of the cement bond. Areas where minor brief variations in the amplitude curve may be caused by the presence of the casing collars 13 will be shown on the curve 77 thus providing additional information to aid the analysis. It can be seen that the amplitude curve alone may not provide completely reliable results and may lead to unnecessary squeeze jobs or cement bonds in areas where the bond is already adequate. However, the simultaneous recording of both amplitude and single receiver velocity curves minimizes the confusion by providing more reliable information.

While the invention has been described in conjunction with an illustrative embodiment, it will be understood that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In a system for logging a cased borehole extending into the earth's formations and having a cement layer between the exterior of the casing and the walls of the borehole the combination of a downhole tool within the borehole;
   a cable extending from the downhole tool through the borehole to the earth's surface;
   means at the surface cooperating with the cable to raise and lower the downhole tool within the borehole; and
   equipment at the surface connected to said cable;
   said downhole tool comprising a casing collar locator for providing collar locating signals having at least one characteristic affected by the casing thickness, a transmitter for repeatedly emitting spaced apart acoustic pulses for transmission through the borehole casing and through the earth formations coupled to the casing through the cement layer and for producing a synchronizing pulse coincident with each acoustic pulse, and a receiver spaced from the transmitter in a direction extending longitudinally of the borehole for receiving said acoustic pulses and for developing corresponding electrical signals;
   means for transmitting to said surface equipment over said cable said collar locating signals, said synchronizing pulses and said electrical signals;
   said surface equipment including recording means connected to said cable for developing longitudinally along a recording medium and in response to said synchronizing pulses and said electrical signals a first curve proportional to the travel time of the acoustic pulses from the transmitter to the receiver at the different borehole depths, means responsive to said electrical signals for developing longitudinally along said recording medium a second curve proportional to the amplitude of the electrical signals at the different borehole depths and spaced from said first curve in a direction extending transversely of said medium, and means connected to said cable and responsive to variations in said characteristic of said collar locating signals for providing an indication on said recording medium from which the depths of the casing collars may be determined, said first and second curves having a common time base so that transversely aligned points represent a common borehole depth, whereby the acoustic pulses arriving at said receiver after passing through the casing and having an amplitude represented by said second curve can be readily distinguished on said second curve from the acoustic pulses arriving at said receiver after passing through the cement layer and the earth formations adjacent the casing by reference to the differences in travel time as indicated on said first curve, the differences in amplitude between the different recordings making up the second curve being influenced by the amount of energy coupled through the cement layer to the earth formations so that high amplitude indications on said second curve represent borehole depths where most of the energy of said pulses passes through the casing to the receiver while low amplitude indications represent borehole depths where a portion of the energy of said pulses is coupled through the cement layer to the earth formations.

2. The apparatus defined by claim 1 wherein the means for providing the casing collar indication comprises recording means for producing a third curve simultaneously with the first and second curves and depicting variations in said characteristic of said casing collar signals as a function of borehole depth.

3. In a system for logging a cased borehole extending into the earth's formations and having a cement layer between the exterior of the casing and the walls of the borehole the combination of a downhole tool within the borehole;
   said downhole tool comprising a casing collar locator for providing collar locating signals having at least one characteristic affected by the casing thickness, a transmitter for repeatedly emitting spaced apart acoustic pulses for transmission through the borehole casing and through the earth formations coupled to the casing through the cement layer and for producing a synchronizing pulse coincident with each acoustic pulse, and a receiver spaced from the transmitter in a direction extending longitudinally of the borehole for receiving said acoustic pulses and for developing corresponding electrical signals; and
   recording means for developing longitudinally along a recording medium and in response to said synchronizing pulses and said electrical signals a first curve proportional to the travel time of the acoustic pulses from the transmitter to the receiver at the different borehole depths, means responsive to said electrical signals for developing longitudinally along said recording medium a second curve proportional to the amplitude of the electrical signals at the different borehole depths and spaced from said first curve in a direction extending transversely of said medium, and means responsive to variations in said one characteristic of said casing collar signals for providing simultaneously with the recording of said first and second curves an indication on said recording medium from which the depths of the casing collars may be determined, said first and second curves having a common time base so that transversely aligned points represent a common borehole depth, whereby the acoustic pulses arriving at said receiver after passing through the casing and having an amplitude represented by said second curve can be readily distinguished on said second curve from the acoustic pulses arriving at said receiver after passing through the cement layer and the earth formations adjacent the casing by reference to the differences in travel time as indicated on said first curve, the differences in amplitude between the different recordings making up the second curve being influenced by the amount of energy coupled through the cement layer to the earth formations so that high amplitude indications on said second curve represent borehole depths where most of the energy of said pulses passes through the casing to the receiver while low amplitude indications represent borehole depths where a portion of the energy of said pulses is coupled through the cement layer to the earth formations.

4. The apparatus defined by claim 3 wherein the means for providing the casing collar indication comprises recording means for producing a third curve simultaneously with the first and second curves and depicting variations in said characteristic of said casing collar signals as a function of borehole depth.

5. A method of determining the quality of a cement bond between the casing of a borehole extending into the earth's formations and the borehole walls, said method comprising the steps of measuring the amplitude of acoustic pulses initially arriving at a receiver from a transmitter of periodic spaced apart pulses after passing through the casing and through the earth formations coupled to said casing through the cement; which transmitter is spaced from the receiver in a direction extending longitudinally of the borehole, moving the transmitter and receiver longitudinally of the borehole while maintaining the fixed spacing therebetween, producing longitudinally along a recording medium a first curve from the amplitude measurements as the transmitter and receiver are moved, measuring the time between transmission of the pulses from the transmitter and the first arrival of these pulses at the receiver after travelling through the casing or through the earth formations around the borehole, producing longitudinally along said recording medium a second curve from the time measurements as the transmitter and receiver are moved, said first and second curves being displaced transversely of said recording medium and having a common time base so that transversely aligned points on said recording medium represent a common borehole depth, whereby the acoustic pulses arriving at said receiver through the casing and having an amplitude represented by the first curve can be readily distinguished on said first curve from the acoustic pulses arriving at said receiver after passing through said cement and said earth formations by reference to the differences in travel time as indicated on said second curve, the amplitudes of the recordings making up said first curve being influenced by the amount of energy coupled through the cement to the earth formations so that high amplitude indications on said first curve represent borehole depths where most of the energy of said pulses passes through the casing to the receiver while low amplitude indications represent borehole depths where a portion of the energy of said pulses is coupled through the cement to the earth formations comparing the first and second curves to determine whether the amplitude indicated on the first curve represents the amplitude of pulses travelling through the casing or that of pulses travelling through the earth formations, and producing on said medium an additional indication which is affected by the thickness of the casing at different depths to facilitate location of the junctions between different sections of the borehole casing.

6. A method of determining the quality of a cement bond between the casing of a borehole extending into the earth's formations and the borehole walls, said method comprising the steps of periodically and successively generating acoustic pulses from a source for transmission through said casing and through the earth formations coupled to said casing by the cement, receiving said pulses at a location spaced from the source in a direction extending longitudinally of the borehole, moving the source and the receiving location longitudinally of the borehole while maintaining a fixed spacing therebetween, producing longitudinally along a recording medium a first curve representing the amplitude of the pulses arriving at the receiving location during the movement, producing longitudinally along said recording medium a second curve representing the time between transmission of the pulses from the source and the first arrival of these pulses at the receiving location after travelling through the casing or through the earth formations around the borehole, said first and second curves being displaced transversely of said recording medium and having a common time base so that transversely aligned points on said recording medium represent a common borehole depth, whereby the acoustic pulses arriving at said receiver through the casing and having an amplitude represented by the first curve can be readily distinguished on said first curve from the acoustic pulses arriving at said receiver after passing through said cement and said earth formations by reference to the differences in travel time as indicated on said second curve, the amplitudes of the recordings making up said first curve being influenced by the amount of energy coupled through the cement to the earth formations so that high amplitude indications on said first curve represent borehole depths where most of the energy of said pulses passes through the casing to the receiver while low amplitude indications represent borehole depths where a portion of the energy of said pulses is coupled through the cement to the earth formations, comparing the first and second curves to determine whether the amplitude indicated on the first curve represents the amplitude of pulses travelling through the casing or that of pulses travelling through the earth formations, and producing on said medium an additional indication which is affected by the thickness of the casing at different depths to facilitate location of the junctions between different sections of the borehole casing.

7. A method of determining the quality of a cement bond between the casing of a borehole extending into the earth's formations and the borehole walls, said method comprising the steps of measuring the amplitude of acoustic pulses initially arriving at a receiver from a transmitter of periodic spaced apart pulses after passing through the casing and through the earth formations coupled to said casing through the cement; which transmitter is spaced from the receiver in a direction extending longitudinally of the borehole, moving the transmitter and receiver longitudinally of the borehole while maintaining the fixed spacing therebetween, producing longitudinally along a recording medium a first curve from the amplitude measurements as the transmitter and receiver are moved, measuring the time between transmission of the pulses from the transmitter and the first arrival of these pulses at the receiver after travelling through the casing or through the earth formations around the borehole, producing longitudinally along said medium and simultaneously with the curve a second curve from the time measurements as the transmitter and receiver are moved, producing on said medium and said first and second curves being displaced transversely of said recording medium and having a common time base so that tranversely aligned points on said recording medium represent a common borehole depth, whereby the acoustic pulses arriving at said receiver through the casing and having an amplitude represented by the first curve can be readily distinguished on said first curve from the acoustic pulses arriving at said receiver after passing through said cement and said earth formations by reference to the differences in travel time as indicated on said second curve, the amplitudes of the recordings making up said first curve being influenced by the amount of energy coupled through the cement to the earth formations so that high amplitude indications on said first curve represent borehole depths where most of the energy of said pulses passes through the casing to the receiver while low amplitude indications represent borehole depths where a portion of the energy of said pulses is coupled through the cement to the earth formations, simultaneously with said amplitude measurements and said time measurements and an additional indication which is affected by the thickness of the casing at different depths to facilitate location of the junctions between different sections of the borehole casing.

8. A method of logging a cased borehole extending into the earth's formations comprising the steps of periodically and successively generating acoustic pulses from a source for transmission through said casing and through the earth formations coupled to said casing by the cement, receiving said pulses at a receiving location spaced from the source in a direction extending longitudinally of the borehole, moving the source and the receiving location longitudinally of the borehole while maintaining a fixed spacing therebetween, producing longitudinally along a recording medium a first curve representing the amplitude of the initially arriving portion of the acoustic pulses at the receiving location during the movement, producing longitudinally along said medium and simultaneously with the curve, a second curve representing the time between transmission of the pulses from the source and the first arrival of these pulses at the receiving location after travelling through the casing or through the earth formations around the borehole, said first and second curves being displaced transversely of said recording medium and having a common time base so that transversely aligned points on said recording medium represent a common borehole depth, whereby the acoustic pulses arriving at said receiver through the casing and having an amplitude represented by the first curve can be readily distinguished on said first curve from the acoustic pulses arriving at said receiver after passing through said cement and said earth formations by reference to the differences in travel time as indicated on said second curve, the amplitudes of the recordings making up said first curve being influenced by the amount of energy coupled through the cement to the earth formations so that high amplitude indications on said first curve represent borehole depths where most of the energy of said pulses passes through the casing to the receiver while low amplitude indications represent borehole depths where a portion of the energy of said pulses is coupled through the cement to the earth formations, and producing on said medium simultaneously with the production of said first and second curves an additional indication which is affected by the thickness of the casing at different depths to facilitate location of the junctions between different sections of the borehole casing.

9. In a system for logging a cased borehole, the combination of a downhole tool disposed within the borehole; a cable connected at one end to said downhole tool and extending through the borehole to the earth's surface; means cooperating with said cable to raise and lower the downhole tool within the borehole; and surface equipment connected to said cable at the earth's surface; said downhole tool comprising a casing collar locator for developing collar locating signals having at least one characteristic affected by the thickness of the borehole casing; means at the surface for measuring said characteristic; a first transmission circuit including said cable connected between said locator and the measuring means; a transmitter on said downhole tool for repeatedly emitting spaced apart acoustic pulses and for producing a synchronizing pulse simultaneously with each acoustic pulse; a receiver on the downhole tool mounted a fixed distance from said transmitter in a direction longitudinally of the borehole for receiving acoustic pulses transmitted through the borehole casing and the earth formations around the borehole and for developing electrical signals corresponding to the received acoustic pulses; the period between successive acoustic pulses being much longer than the time required for the acoustic pulse to travel from the transmitter to the receiver, means responsive to each synchronizing pulse for rendering said first transmission circuit ineffective to transmit said collar locating signals to said measuring means for a predetermined measuring interval following each synchronizing pulse, which interval is much shorter than the period between successive acoustic pulses but is sufficient to permit the acoustic pulse to reach the receiver from the transmitter; a second transmission circuit including said cable for transmitting said synchronizing pulse and said electrical signals to the surface equipment; means in the surface equipment responsive to each synchronizing pulse for developing a timing signal having a monotonically varying amplitude and having a duration generally coextensive with said measuring interval, said surface equipment including first and second signal channels each receiving said electrical signals, first recording means responsive to the output of the first channel for developing a curve proportional to the amplitude of the elecetrical signals at the different borehole depths traversed by the downhole tool, means responsive to the output of the second channel and to said timing signal for developing a control signal having an amplitude proportional to the amplitude of the timing signal at the instant of arrival of the acoustic pulse at the receiver; and second recording means for recording said control signal to produce a curve proportional to the travel time of the acoustic pulse from the transmitter to the receiver at the different borehole depths traversed by the downhole tool.

References Cited by the Examiner

UNITED STATES PATENTS

| | | | |
|---|---|---|---|
| 2,233,992 | 3/1941 | Wycoff | 340—18 |
| 2,320,890 | 6/1943 | Russell | 250—83.6 |
| 2,352,993 | 7/1944 | Albertson | 250—83.6 |
| 2,469,461 | 5/1949 | Russell | 250—83.6 |
| 2,554,844 | 5/1951 | Swift | 340—18 X |
| 2,857,011 | 10/1958 | Summers | 181—0.5 |
| 3,019,414 | 1/1962 | Peterson | 181—0.5 X |
| 3,186,223 | 6/1965 | Wilson | 181—0.5 |

BENJAMIN A. BORCHELT, *Primary Examiner.*

KATHLEEN H. CLAFFY, SAMUEL FEINBERG,
*Examiners.*

V. J. DI PIETRO, J. W. MILLS, W. KUJAWA,
*Assistant Examiners.*

UNITED STATES PATENT OFFICE
CERTIFICATE OF CORRECTION

Patent No. 3,295,628　　　　　　　　　　　　　　　January 3, 1967

Gerald C. Summers

It is hereby certified that error appears in the above numbered patent requiring correction and that the said Letters Patent should read as corrected below.

Column 12, line 8, strike out "bond between the casing of a borehole extending into the"; column 13, lines 1 and 2, strike out "producing on said medium and"; line 21, for "formations," read -- formations and producing on said medium --; column 14, line 41, for "elecetrical" read -- electrical --.

Signed and sealed this 3rd day of October 1967.

(SEAL)
Attest:

ERNEST W. SWIDER　　　　　　　　　　　　　　　EDWARD J. BRENNER
Attesting Officer　　　　　　　　　　　　　　　　　Commissioner of Patents